United States Patent
McIntyre

(10) Patent No.: US 11,250,980 B2
(45) Date of Patent: Feb. 15, 2022

(54) SYSTEM AND METHOD FOR THE RECYCLING OF RARE EARTH MAGNETS

(71) Applicant: UT-Battelle, LLC, Oak Ridge, TN (US)

(72) Inventor: Timothy J. McIntyre, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 118 days.

(21) Appl. No.: 16/830,932

(22) Filed: Mar. 26, 2020

(65) Prior Publication Data

US 2020/0227194 A1    Jul. 16, 2020

Related U.S. Application Data

(62) Division of application No. 15/341,057, filed on Nov. 2, 2016, now Pat. No. 10,643,776.

(Continued)

(51) Int. Cl.
*H01F 13/00* (2006.01)
*B23K 26/40* (2014.01)
(Continued)

(52) U.S. Cl.
CPC ......... *H01F 13/006* (2013.01); *B03C 1/0335* (2013.01); *B03C 1/26* (2013.01); *B23K 26/40* (2013.01); *H05B 6/103* (2013.01); *H05B 2206/023* (2013.01); *Y02P 10/20* (2015.11); *Y02W 30/50* (2015.05)

(58) Field of Classification Search
CPC ....... H01F 13/006; B03C 1/0335; B03C 1/26; H05B 6/103; H05B 2206/023; B23K 26/40; Y02W 30/541; Y02P 10/24
See application file for complete search history.

(56) References Cited

U.S. PATENT DOCUMENTS 7,534,980 B2    5/2009  Wilgen et al.
2014/0366687 A1*  12/2014  Zakotnik ............ B22F 8/00
                                              75/246

FOREIGN PATENT DOCUMENTS

CN    201259811    *   6/2009   ............ H01F 13/00
CN    201259811 Y        6/2009
(Continued)

OTHER PUBLICATIONS

"Smart Camera Integration in Machine Vision Systems," ThomasNet Jan. 24, 2012 [online], [retrieved on Mar. 1, 2017], URL: https://web.archive.org/web/20120124060248/http://www.thomasnet.com/articles/automation-electronics/smart-camera-machine-vision-system (Year: 2012).*

(Continued)

*Primary Examiner* — Daniel C. McCracken
(74) *Attorney, Agent, or Firm* — Warner Norcross + Judd LLP

(57) ABSTRACT

A system and a method for separating and recycling magnets made from rare earth elements from an article of manufacture used an alignment device to property position the rare earth magnet for processing. Once proper alignment is made, a separating device removes the magnet and a portion of the article. A heating device demagnetizes the magnets and vibration causes the magnets to separate from the portion of the article. Electromagnets remove the portion of the article and the rare earth magnets pass through for reclamation.

11 Claims, 4 Drawing Sheets

Related U.S. Application Data

(60) Provisional application No. 62/251,777, filed on Nov. 6, 2015.

(51) Int. Cl.
    *H05B 6/10*    (2006.01)
    *B03C 1/26*    (2006.01)
    *B03C 1/033*    (2006.01)

(56) References Cited

FOREIGN PATENT DOCUMENTS

| WO | 2012/101398 A1 | 8/2012 | |
|---|---|---|---|
| WO | WO 2012/101398 | * 8/2012 | ............. H01F 1/055 |

OTHER PUBLICATIONS

Daniels, Design and Implementation of a Hall Effect Sensor Array Applied to Recycling Hard Drive Magnets, IEEE SoutheastCon 2015, Apr. 9-12, 2015 (Year: 2015).*

PCT/US16/59970 International Search Report and Written Opinion dated Jan. 26, 2017.

Daniels, Ryan J. et al. "Design and Implementation of a Hall Effect Sensor Array Applied to Recycling Hard Drive Magnets," IEEE SoutheastCon 2015, Apr. 9-12, 2015.

"Smart Camera Integration in Machine Vision Systems," ThomasNet. Jan. 24, 2012 [online], [retrieved on Mar. 1, 2017]. URL: https://web.archive.org/web/20120124060248/http://www.thomasnet.com/articles/automation-electronics/smart-camera-machine-vision-system.

* cited by examiner

SYSTEM AND METHOD FOR THE RECYCLING OF RARE EARTH MAGNETS

CROSS-REFERENCE TO RELATED APPLICATIONS

This application is a divisional of U.S. patent application Ser. No. 15/341,057, filed Nov. 2, 2016, which claims the benefit of U.S. Provisional Application 62/251,777, filed Nov. 6, 2015, the disclosures of which are incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a system and a method for the recycling of rare earth magnets from electronic devices and other articles of manufacture.

BACKGROUND OF THE INVENTION

Rare earth elements include seventeen chemical elements, specifically fifteen lanthanides, scandium and yttrium. Rare earth magnets are strong permanent magnets made from alloys of rare earth elements and non-rare earth elements. Developed in the 1970s and 1980s, rare earth magnets produce stronger magnetic fields than ferrite magnets or alnico magnets. More than 60,000 metric tons of rare earth neodymium materials are produced annually from mining operations. This material is primarily used in the manufacture of magnets for hard drives, electric motors, refrigeration compressors, generators, power tools and many other consumer goods.

Rare earth magnets are typically not recycled however. In the case of hard drives, more than 500 million computer hard drives are manufactured annually, while few are recycled. Disposal operations primarily include shredding hard drives with e-waste recyclers. Steel and aluminum are typically electromagnetically sorted from the shredded material stream for recycling. The remaining components, including the rare earth magnets, are treated as waste.

The sheer number of hard drives manufactured each year represents a significant portion of rare earth magnets available for recycling. High throughput, low cost systems for rare earth magnet recycling could supply more than one-third of the demand for rare earth materials in the United States. Accordingly, there remains a continued need for systems and methods for the recycling of rare earth magnets from hard drives and other devices.

SUMMARY OF THE INVENTION

A system and method for recycling rare earth materials from hard drives or other articles of manufacture are provided. The system and method generally include aligning articles of manufacture in a mixed product stream into a predetermined orientation, removing rare earth magnets from the articles of manufacture, heating the rare earth magnets to above a Currie temperature to demagnetize the rare earth magnets, and separating the demagnetized rare earth magnets from residual waste components, optionally for formation into new magnetic stock.

In one embodiment, the mixed product stream includes a collection of hard drives having rare earth magnets. The hard drives are aligned with the aid of a machine vision system to facilitate removal of the rare earth magnets, optionally using a punch, a water jet, a laser, or other separating device to free the rare earth magnets from the hard drives. The rare earth magnets are then rapidly heated to above their Curie temperature using an induction heating coil to substantially remove the magnetic properties of the rare earth magnets and to break down any adhesives that retain the rare earth magnets to conjoining materials. The demagnetized rare earth magnets are then separated from any residual components of the hard drives, optionally using an electromagnet to attract paramagnetic or ferromagnetic materials from the hard drives.

In another embodiment, the machine vision system includes an X-Ray system or a magnetic imaging system to determine the approximate location of the rare earth magnet within each article of manufacture in the mixed product stream. The output of the X-Ray system or the magnetic imaging system is coupled to a processor to provide each article of manufacture with the desired, predetermined alignment prior to removal of the rare earth magnets.

In another embodiment, the hard drives are sorted prior to alignment. Sorting of the hard drives can include separating the hard drives into multiple product streams based on hard drive size or other measurable parameter. Once freed from the host hard drive, the rare earth magnets can be heated while subject to vibration from an electromagnetic acoustical transducer. The vibrations can be confined to the induction field of the induction heating coil while heating the rare earth magnets to above their Curie temperature.

The system and method can be readily adapted for the removal of rare earth magnets from a variety of articles of manufacture, including hard drives, electric motors, power tools, refrigeration compressors, and electric generators. The system and method are scalable into an automated continuous process for reclaiming rare earth materials from greater than 1000 articles of manufacture per hour. The reclaimed rare earth materials can be further processed into constituent elements before being recombined for new purposes to address the increasing demand for rare earth materials in consumer electronics and other applications.

These and other features and advantages of the present invention will become apparent from the following description of the invention, when viewed in accordance with the accompanying drawings and appended claims.

DETAILED DESCRIPTION OF THE CURRENT EMBODIMENTS

The embodiments as contemplated and disclosed herein include a system for recycling rare earth materials and a related method of operation. The system and method generally include removing rare earth magnets from aligned and sorted articles of manufacture in a mixed product stream, heating the rare earth magnets to above a Currie temperature to demagnetize the rare earth magnets, and separating the demagnetized rare earth magnets from residual components of the mixed product stream.

The current embodiments are described below in connection with hard drives, but can be used with other articles of manufacture. As used herein, an "article of manufacture" means any mechanical, electro-mechanical, or electrical device having multiple components. Example articles of manufacture having rare earth magnets include hard drives, electric motors, power tools, refrigeration compressors, and electric generators. The articles of manufacture can each have one rare earth magnet in some embodiments while in other embodiments the articles of manufacture can each have two or more rare earth magnets. As also used herein, a "mixed product stream" means a continuous or discontinuous run of two or more articles of manufacture, the articles of manufacture being similar in some embodiments (e.g., only hard drives) and dissimilar in other embodiments (e.g., hard drives and electric motors).

Figure 1:
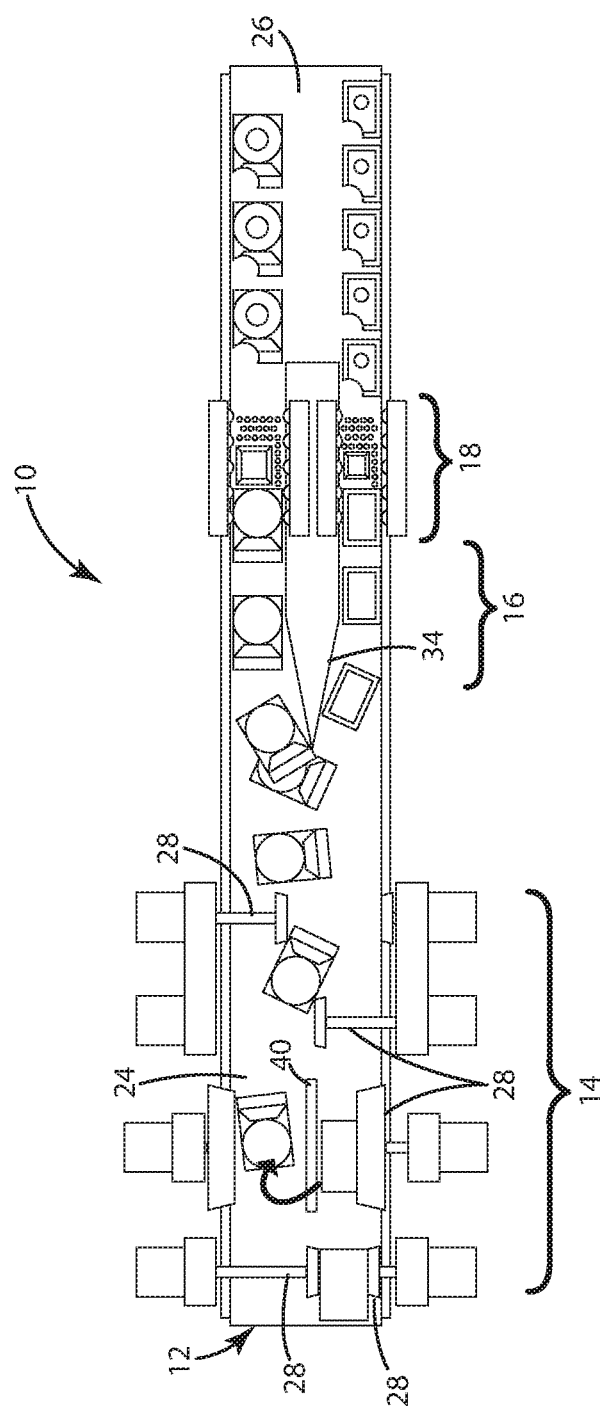
FIG. 1 is a top view of a rare earth magnet recycling system.

Referring now to FIG. 1, a system for recycling rare earth materials from articles of manufacture is provided and generally designated 10. The system 10 generally includes a feed system 12, an alignment system 14, a pre-removal sorting system 16, a magnet removal system 18, a demagnetizing system 18, and a post-removal sorting system 22. Greater or fewer systems can be implemented in other embodiments as desired. Each system 12, 14, 16, 18, 20, 22 and its constituent components is discussed in greater detail below. Though described separately for clarity, these systems can be closely integrated, often with a degree of overlap, to provide the continuous removal of rare earth magnets at relatively high speeds.

The feed system 12 is adapted to transport hard drives in a mixed product stream. A first section of the feed system 12 is positioned before the magnet removal system 18, and a second portion of the feed system 12 is positioned after the magnet removal system 18. In the embodiment illustrated FIGS. 1-3, the feed system 12 includes first and second endless belt conveyors 24, 26 for transporting hard drives. Other feed systems can include a roller conveyor, for example a gravity roller conveyor system. In the illustrated embodiment, the mixed product stream includes 2.5" hard drives and 3.5" hard drives. The feed system can include a bulk container for depositing hard drives one-by-one on the first conveyor. Alternatively, the hard drives can be manually placed on the first conveyor.

The alignment system 14 is adapted to align the hard drives in advance of the magnet removal system 18 to place the internal magnets in the desired location for removal. More specifically, the alignment system 14 includes one or more alignment devices 28 and cameras 30 for providing the hard drives with a predetermined orientation. The predetermined orientation can include, for example, a) the longitudinal axis of the hard drives being parallel to or perpendicular to its direction of travel, b) the major surface of the hard drives being completely level atop the conveyor system, and/or c) the product identifier (e.g., a barcode) being visible on an upward facing surface of the hard drives. In addition, the predetermined orientation may be specific to each category of hard drive. To provide the desired predetermined orientation for each hard drive, the alignment system 14 can, first, determine the orientation of each hard drive and/or its internal magnet, second, provide each hard drive with the desired orientation, and, third, verify the orientation of each hard drive and/or its internal magnet.

Figure 4:
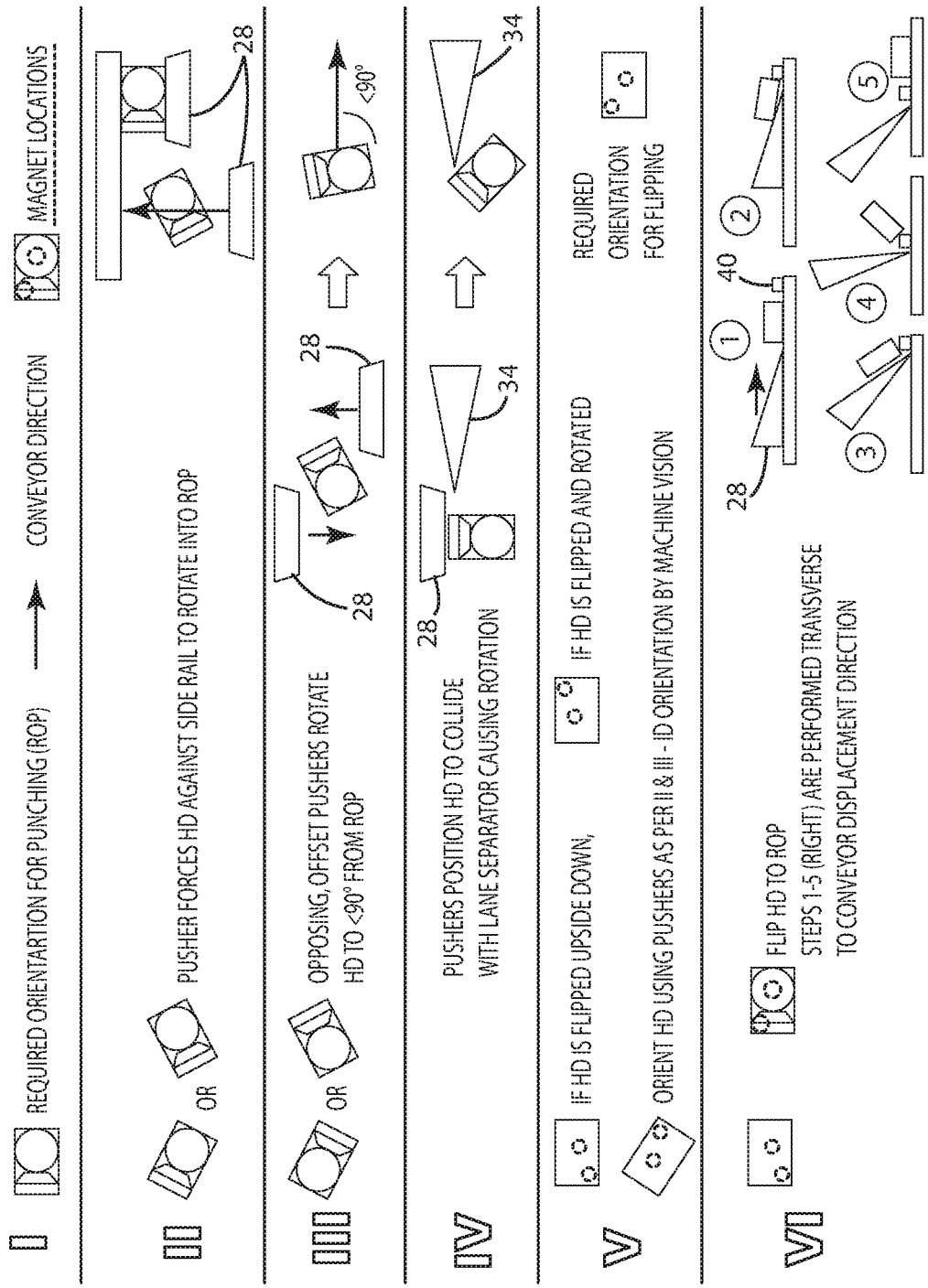
FIG. 4 is a schematic illustration of various techniques for aligning hard drives in the rare earth magnet recycling system of FIG. 1.

The alignment devices 28 are illustrated in FIG. 4 as pneumatically-operated or solenoid-operated pushers, flippers, and rotators to provide the hard drives with the Required Orientation for Punching (ROP). Other alignment devices can include air nozzles for example. A hard drive having the desired orientation on a conveyor belt is shown at 4-I. One or more of the alignment devices 28 from 4-II, 4-III, 4-IV, and 4-V can be used to achieve this desired orientation. At 4-II, the alignment devices 28 push hard drives against a side rail 32 to effect a rotation of less than ninety degrees, such that the longitudinal axis of the hard drives is parallel to the direction of travel. At 4-II, opposing, offset alignment devices 28 rotate hard drives less than ninety degrees, such that the longitudinal axis of the hard drives is transverse to the direction of travel. At 4-III, alignment devices 28 displace some hard drives relative to a lane separator 34 to ensure the correct hard drive format is directed into the proper lane 36, 38. At 4-IV, a combination of alignment devices 28 provide an upside-down hard drive with the ROP. At 4-V, a ramped alignment device 28 flips a hard drive over a lip 40 such that the product identifier is visible on an upward facing surface of the hard drive.

As noted above, the alignment system 14 includes one or more cameras 30 as part of a machine vision system to provide the hard drives with the ROP. The cameras 30 provide complimentary images of each hard drive in the mixed product stream for output to a processor 42. The processor 42 can include a programmable logic controller (PLC), a field programmable gate array (FPGA), or an application specific integrated circuit (ASIC), for example. The processor is adapted to determine the orientation of each hard drive and/or its internal magnet, activate the actuators to provide the ROP, and track each hard drive. The alignment system 14 can additionally include a barcode reader or quick response (QR) code reader to identify each hard drive and populate a database accessible by the processor 42 and stored in non-transient computer readable memory. The database can aid in the automated alignment of the hard drives. For example, the database can include location data pertaining to the position of the magnet or magnets within the corresponding hard drive. This location information can be used to properly align the hard drives prior to the magnet removal operation.

The cameras 30 can be electro-optical cameras in some embodiments. The alignment system 14 can additionally be adapted to determine the location of the rare earth magnet within each hard drive. To do so, the alignment system 14 can include an X-Ray system or a magnetic imaging system 44, the output of which is coupled to the processor 42 to provide each hard drive with the desired, predetermined alignment prior to removal of the rare earth magnets. There are generally two locations within hard drives where magnets are located: the voice coil actuator and the spindle motor. The magnet associated with the spindle motor is generally of less value than the magnet associated with the voice coil actuator, but can be removed from the hard drive if desired. These magnets are visible in X-Ray radiography of the hard drive. That is, the voice coil magnet and the spindle motor magnet are visible as a result of their density contrast relative to surrounding materials (e.g., aluminum). Magnetic field imaging offers a more qualitative picture of magnet location, but provides confirmation that magnets are present. The size and location of magnets are largely predicable due to standardized industry design practices. Consequently, X-Ray radiography and magnetic field imaging may not be desired in recycling operations involving hard drives. For other items, for example electric motors and consumer power tools, X-Ray radiography and/or magnetic field imaging may be desired to more accurately locate and position the internal magnet before removal.

The pre-removal sorting system 16 is adapted to sort each hard drive based on one or more criteria. In the illustrated embodiment, the sorting criteria can include the size of the hard drive, e.g., 3.5" hard drives as compared to 2.5" hard drives. In other embodiments, the sorting criteria can include the particular model of the hard drive, which can impact the location of the rare earth magnet(s) within the hard drive. Still other sorting criteria (e.g., characteristics of interest) can include the brand of the hard drive or the orientation of the hard drive as determined by electronic pin location or fastener location, or other identifying features. The pre-removal sorting system 16 includes a passive sorting device 34, which in the illustrated embodiment is a wedge. The wedge 34 functions as a passive lane separator to sort the hard drives as they move through the pre-removal sorting system 16. In other embodiments the pre-removal sorting system 16 includes an active sorting device, for example a pneumatically-operated flipper, a solenoid-operated pusher plate, or an air nozzle, to cause a passing hard drive to enter a designated removal lane 36, 38.

Though described above as following the alignment system 14, the pre-removal sorting system 16 can precede the alignment system 14. For example, the pre-removal system sorting system 16 can sort the hard drives into parallel alignment sub-sections. The pre-removal sorting system 16 can be omitted if all hard drives are effectively identical for purposes of removal of the internal rare earth magnet.

Figure 3:
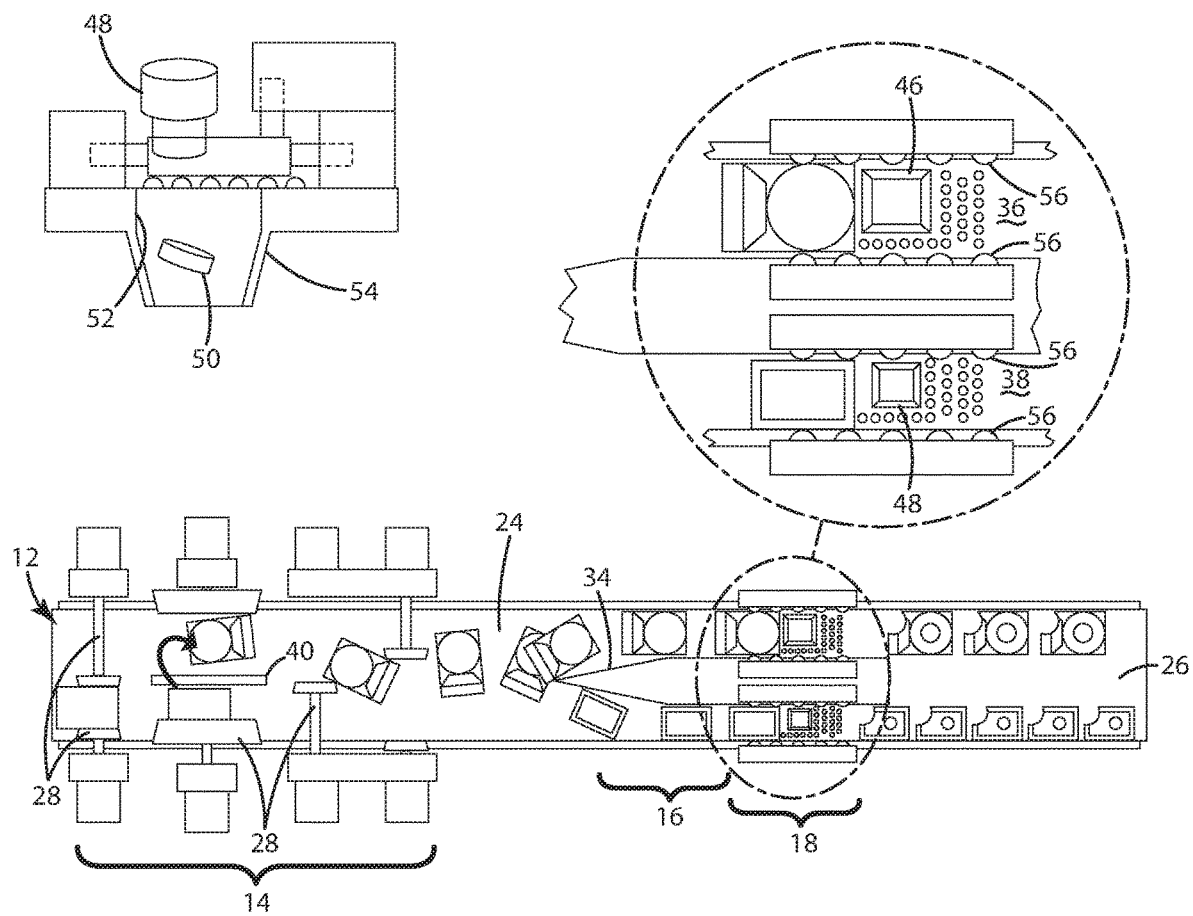
FIG. 3 is a top view of the rare earth magnet recycling system of FIG. 1 illustrating removal of rare earth magnets with a hydraulic punch.

The magnet removal system 18 is adapted to remove the rare earth magnets from the aligned and sorted hard drives. The magnet removal system 18 includes a separating device 46, 48 for separating the magnets from the hard drives. As shown in FIG. 3, the separating device 46, 48 includes a punching section having a punch and a die for each lane 36, 38. The punch is shaped to encompass the rare earth magnet within the hard drive and is positioned above a corresponding opening in the die. The punch and the die can be made from high carbon steel and can be heat treated and coated for toughness. As shown in FIG. 3, each removal lane 36, 38 includes a different sized punch and die for different sized rare earth magnets. Actuation of the punch causes a forceful separation of the magnets, along with residual components of the hard drive (e.g., its casing), from the remainder of the hard drive. The rare earth magnet is contained within the resulting slug or blank 50, the slug or blank also including residual casing metals and other metal components for example. The slug or blank 50 falls through an opening 52 in the feed system 12 into a vertical receiving chute 54 for demagnetization by the demagnetizing system 20. The remainder of the hard drive continues along the second portion of the feed system 26, optionally for further separation processing or into a waste receptacle for shredding.

FIG. 3 provides a more detailed view of the punching section. The magnet removal system 18 includes a ball bearing roller table to allow hard drives to move freely therethrough. Upon entering the punching section, the hard drives are captured by guide rollers 56 from both sides. An additional set of guide rollers capture the hard drives from above to firmly position and retain the hard drives during the punching process. Precise positioning of the hard drives is controlled by a machine vision system, including the processor 42 and cameras 30. As used herein, a "machine vision system" means a processor and at least one camera to provide imaging-based automatic inspection and analysis. The machine vision system described above is adapted to aid the following tasks: alignment of the hard drives and removal of the internal rare earth magnets. Processing steps are performed in computer logic to rapidly evaluate which hard drives need to be oriented (and how) and precisely when to actuate the separating device, optionally as quickly as (or quicker than) 60 hard drives per minute.

As noted above, the magnet removal system 18 can be used to precisely remove a magnet from a hard drive. According to a first option, the magnet removal system 18 includes a round punch (e.g., ¾") to remove a voice coil pivot and includes a larger press of arbitrary shape to separate the remaining magnet portion from what remains of the hard drive. By separating the magnet assembly from the voice coil pivot, heating and vibrating the magnet-containing slug (discussed below) liberates the internal magnet. According to a second option, a larger punch (e.g., 3") is employed to separate a magnet-containing-portion from the remainder of the hard drive. The resulting slug is then repositioned to remove the voice coil pivot by a second punching step. This is essentially the reverse order of the first option. According to a third option, a custom punch separates a magnet-containing-portion from the hard drive (and the voice coil pivot) in a single punch step. These options are aided by the precise positioning of each hard drive by the alignment system 14. The precise positioning of each hard drive is further aided by the identification of each hard drive, which can be cross-referenced in the database by model number to determine the precise location of the internal magnet(s).

Though described above as a punch and a die, the separating device 46, 48 can alternatively include a waterjet device, a laser device or other cutting methods such as mechanical shearing or sawing. For example, the hard drives can be processed with a water jet cutter or a laser cutter to remove the magnets. This process makes a very smooth cut and does not upset the components in the hard drive, but it is more time consuming than a punch. A plasma cutter may also be used, but can require control of hot slag/sparks to prevent fires.

Figure 2:
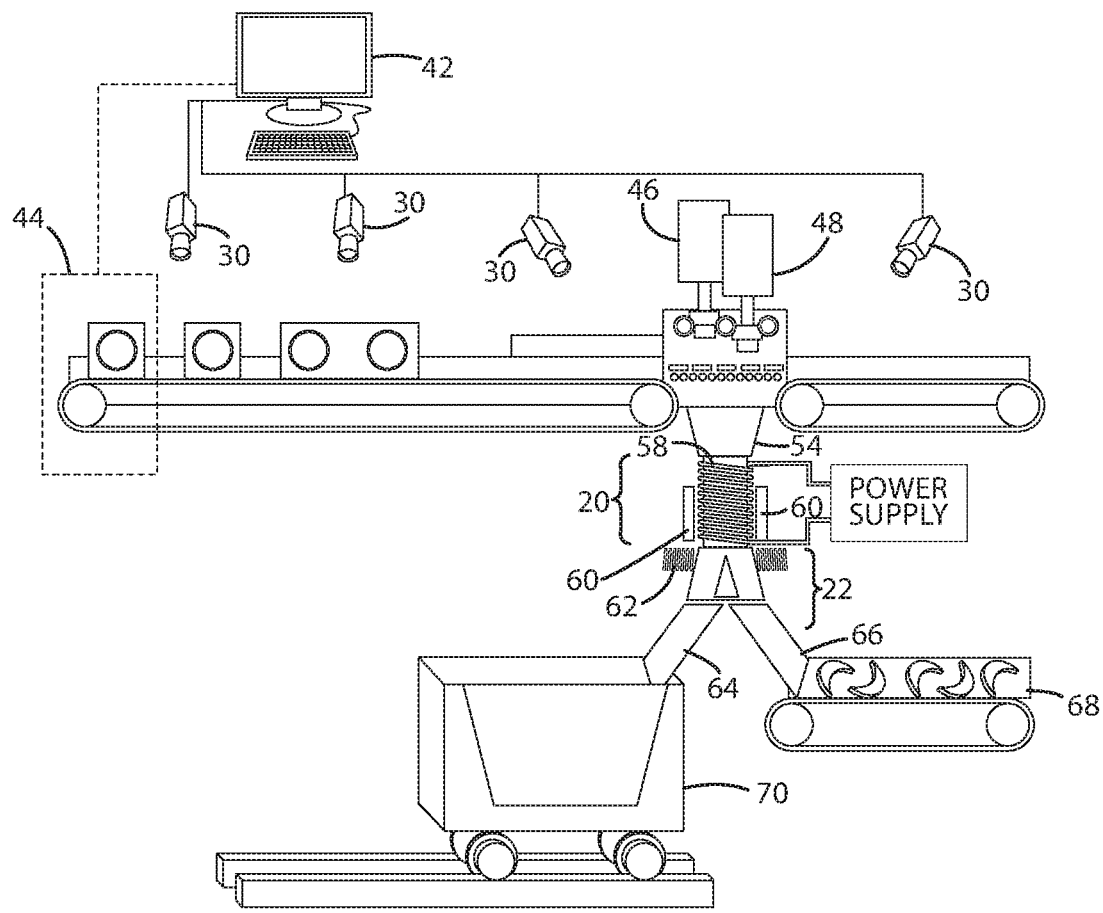
FIG. 2 is a side view of the rare earth magnet recycling system of FIG. 1.

The demagnetization system 20 is adapted to demagnetize the rare earth magnets that are separated from the hard drives. The demagnetization system 20 includes a heating device to rapidly heat the rare earth magnets to above their Currie temperature. Heating of the rare earth magnets also defeats any adhesives that may be present. As shown in FIG. 2, the heating device includes an induction heater 58 surrounding the receiving chute 54 to heat the free-falling magnets to at least 320° C. in fewer than five seconds, thereby minimizing any physical degradation to the magnets. In other embodiments the demagnetization occurs while the magnets are resting on a side conveyor, rather than in free-fall. The heating provides a thermal shock to the slug or blank due to coefficient of thermal expansion differences among materials in the slug or blank.

Static magnetic fields from voice coil magnets 60 are placed in the induction heater as shown in FIG. 2 to induce a high acoustic vibration in the hard drive magnet and its surrounding iron flux containment assembly. The purpose of the vibration is to assure separation of the hard drive magnetic components. The acoustic vibration is generated by the electromagnetic acoustical transducer (EMAT) effect as described in U.S. Pat. No. 7,534,980 to Weilgen et al, the disclosure of which is incorporated by reference in its entirety. This method of vibration is highly efficient and imposes the vibration only on components in the induction field. The acoustic energy comes about from the J×B force (Lorentz force). The J current is provided by the mirror currents of the induction field and the B field is provided by the external static magnetic structure. The Lorentz force is so intense that only small static fields are required of less than one Tesla, which can be supplied by permanent magnets or DC electromagnets. Typical induction frequencies used to accomplish EMAT vibrations can be from 1 kHz to 30 kHz. These frequencies can also be in the effective range for induction heating of the slugs or blanks containing the rare earth magnets.

The post-removal sorting system 22 includes an electromagnet 62 to remove residual portions of the hard drive from the recovered rare earth magnet. As shown in FIG. 2, the electromagnet 62 straddles the receiving chute 54 (or side conveyor) to draw paramagnetic or ferromagnetic materials onto a first recycle chute 64 while the demagnetized magnets continue with a slightly forward trajectory (not shown) onto a second recycle chute 66. The recovered rare earth magnets are illustrated as being collected on a further conveyor 68 in FIG. 2, while the waste materials (steel, aluminum, copper, and e-waste) continue into a cart 70 for disposal.

A related method of operation includes: providing a plurality of hard drives (or other articles of manufacture having rare earth magnets) in a mixed product stream; pre-positioning or aligning each of the plurality of hard drives; sorting each of the plurality of hard drives; removing rare earth magnets from the hard drives; demagnetizing rare earth magnets having been removed from the hard drives; and separating the demagnetized rare earth magnets from residual components of the hard drives. The foregoing method can be performed in conjunction with the system of FIGS. 1-4 and can be modified to include greater or fewer method steps in other embodiments as desired.

For example, aligning the hard drives can include orienting hard drives such that the internal magnet is pre-positioned for removal. Aligning the hard drives can be performed with the aid of a machine vision system and optionally with an X-Ray or magnetic imaging system. Sorting of the hard drives can include separating the hard drives into multiple product streams based on hard drive size or other measurable parameter. Removing the magnets can include punching the rare earth magnets free of the hard drives using a punch and a die. Demagnetizing the magnets can include heating the magnets to above their Currie temperature using an induction heating coil. Once freed from the host hard drive, the rare earth magnets can be also heated while subject to vibration from an electromagnetic acoustical transducer. Separating the demagnetized rare earth magnets from residual components of the hard drives can include collecting, using an electromagnetic, residual components of the hard drives.

The system and method described can be adapted for the removal of rare earth magnets from a variety of articles of manufacture, including hard drives, electric motors, power tools, refrigeration compressors, and electric generators. The system and method are scalable into an automated continuous process for reclaiming rare earth materials from greater than 1000 articles of manufacture per hour. The reclaimed rare earth materials can be further processed into constituent elements before being recombined for new purposes to address the increasing demand for rare earth materials in consumer electronics and other devices.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A method for recycling rare earth magnets from articles of manufacture comprising:
   aligning the articles of manufacture into a predetermined orientation using a magnetic imaging system and one or more alignment devices to flip, position or rotate the articles of manufacture;
   separating rare earth magnets from the articles of manufacture;
   heating and demagnetizing the rare earth magnets that are separated from the articles of manufacture; and
   separating the demagnetized rare earth magnets from residual portions of the articles of manufacture.

2. The method according to claim 1 wherein the aligning step includes using a vision system and one or more alignment devices to flip, position or rotate the articles of manufacture.

3. The method according to claim 1 wherein the aligning step includes using an X-Ray system and one or more alignment devices to flip, position or rotate the articles of manufacture.

4. The method according to claim 1 wherein separating rare earth magnets from the articles of manufacture is performed with a punch, a waterjet, or a laser.

5. The method according to claim 1 wherein the heating step includes using an induction heating coil.

6. The method according to claim 5 wherein the heating step further includes using an electromagnetic acoustical transducer for inducing vibration in the induction field of the induction coil.

7. A method for recycling rare earth materials from articles of manufacture including rare earth magnets, the method comprising:
   aligning the articles of manufacture in a mixed product stream to pre-position the rare earth magnets for removal;
   removing the rare earth magnets from the articles of manufacture in the mixed product stream by punching the rare earth magnets free of the articles of manufacture using a punch and a die;

heating the rare earth magnets to above the Currie temperature of the rare earth magnets to demagnetize the rare earth magnets; and separating the demagnetized rare earth magnets from the remainder of the mixed product stream for formation into new magnetic stock.

8. The method according to claim 7 wherein aligning the articles of manufacture includes aligning the longitudinal axis of each of the articles of manufacture with its direction of travel.

9. The method according to claim 7 wherein aligning the articles of manufacture includes orienting the longitudinal axis of each of the articles of manufacture transverse to its direction of travel.

10. The method according to claim 7 wherein heating the rare earth magnets is performed using an induction heating coil and an electromagnetic acoustical transducer for inducing vibration in the induction field of the induction heating coil.

11. The method according to claim 7 wherein separating the demagnetized rare earth magnets from the remainder of the mixed product stream includes collecting, using an electromagnetic, residual components of the articles of manufacture in the remainder of the mixed product stream.

* * * * *